Oct. 18, 1938.  F. L. DARLING  2,133,891
BRAKE HOLDING APPARATUS
Filed Feb. 3, 1938  2 Sheets-Sheet 1
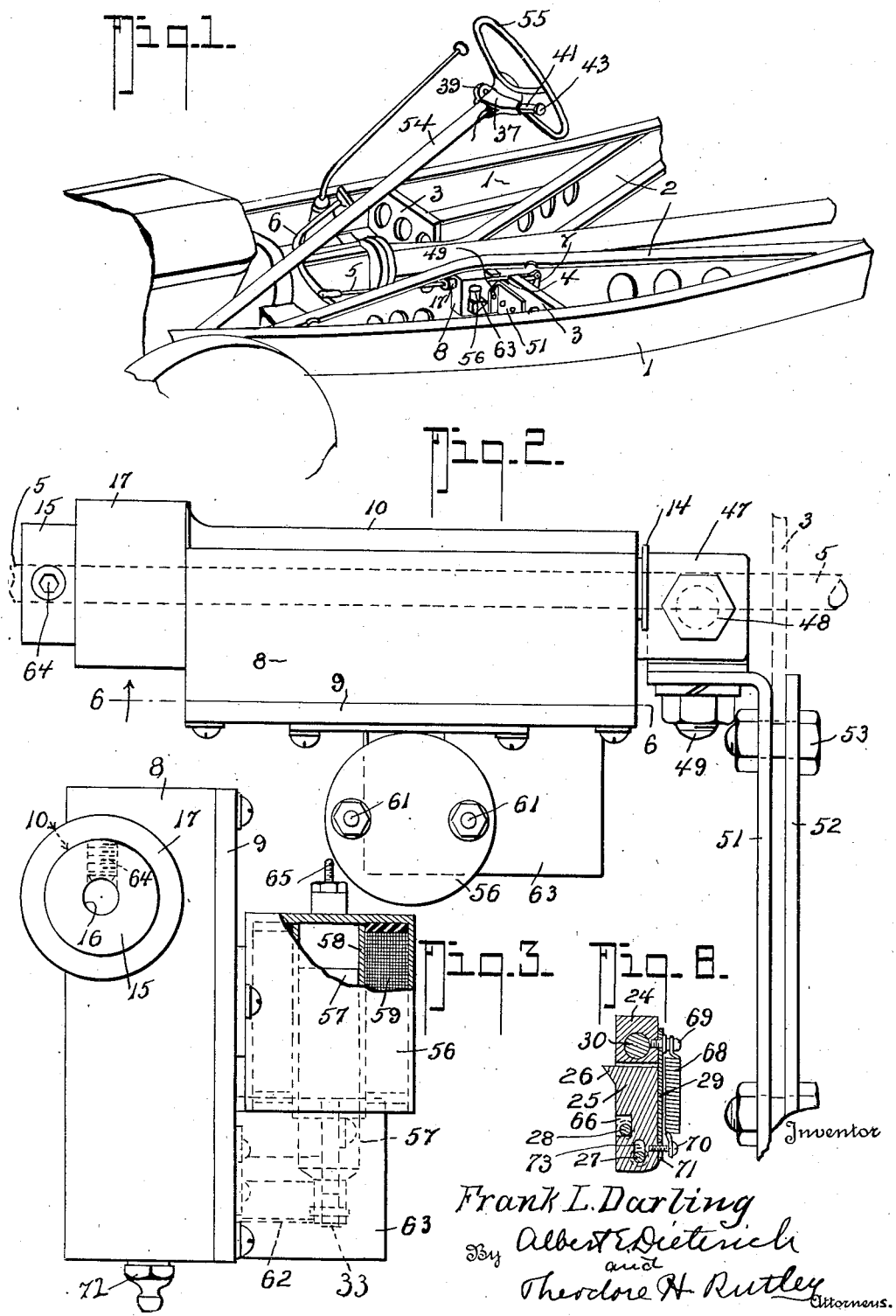

Oct. 18, 1938.  F. L. DARLING  2,133,891
BRAKE HOLDING APPARATUS
Filed Feb. 3, 1938  2 Sheets-Sheet 2
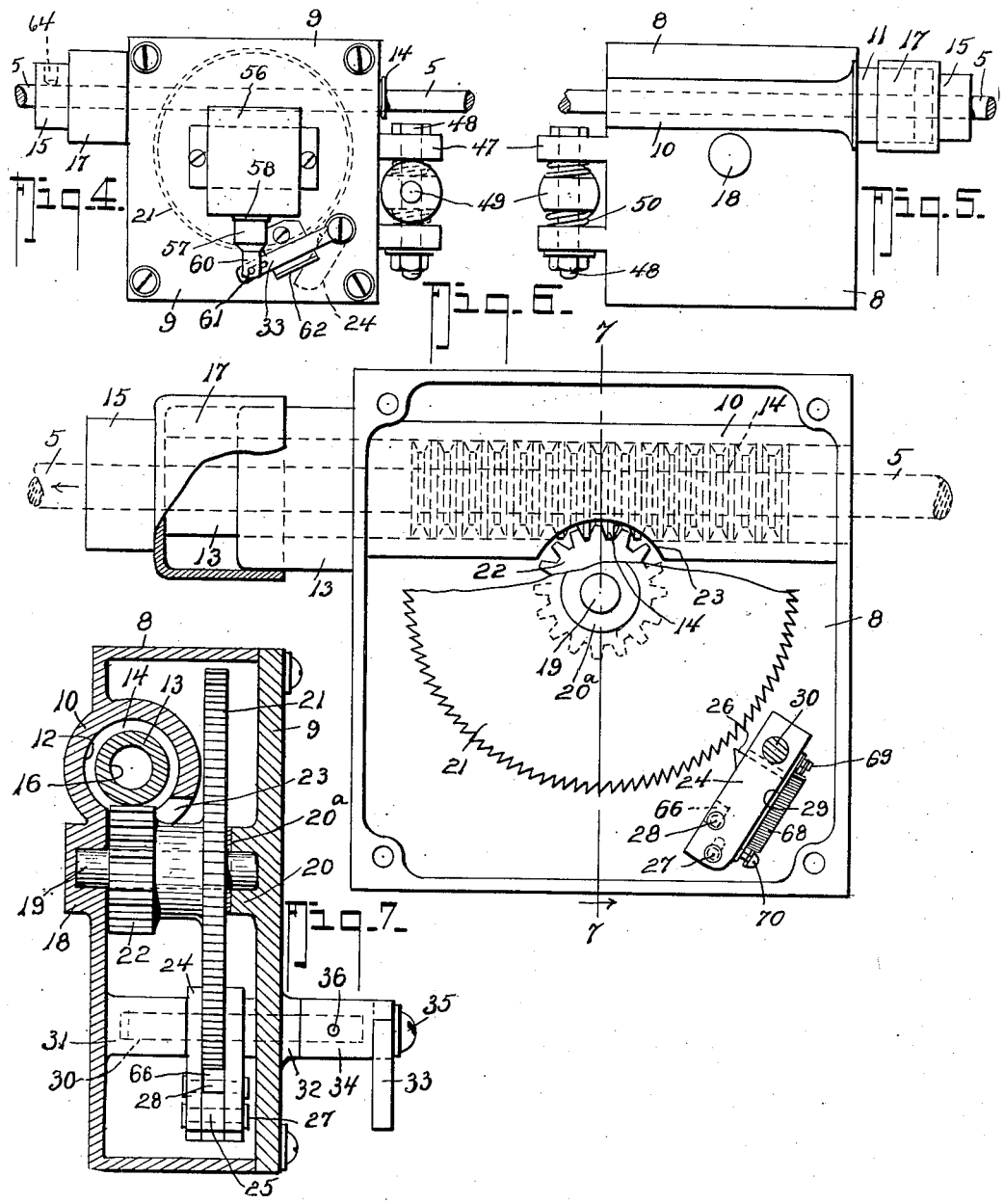
Inventor
Frank L. Darling
Albert E. Dieterich
and
Theodore H. Rutley
By Attorneys Patented Oct. 18, 1938

2,133,891

UNITED STATES PATENT OFFICE 2,133,891

BRAKE HOLDING APPARATUS

Frank L. Darling, New York, N. Y.

Application February 3, 1938, Serial No. 188,563

20 Claims. (Cl. 188—265)

My invention relates particularly to motor vehicles having mechanically actuated brakes, although it can be adapted to other types of brakes if desired.

More especially the invention has been designed and adapted for use on the well-known Ford automobile of the present day.

Drivers of automobiles generally have recognized the dangers and inconveniences of having to hold one's foot on the brake pedal while the vehicle has made a temporary stop, as for a traffic light. Especially is danger present if the vehicle has stopped while on its way up a hill for then when the driver wishes to start the machine rolling forwardly he must shift his foot from the brake pedal to the accelerator pedal and during the interval of shift the car is unbraked and usually begins to roll backwardly a greater or lesser distance, depending on the time required by the operator to shift his foot over from the brake pedal to the accelerator pedal. Some drivers when making short time stops frequently use the clutch as a brake to hold the car from rolling backward, while maintaining a foot also on the accelerator pedal for a quick getaway, with consequent unnecessary wear on the clutch, resulting in expensive relining or clutch replacing repairs.

Again, in going down long hills, the driver not infrequently gets tired of holding his foot in the brake-applying position.

It is therefore an object of the invention to provide a device of a simple, inexpensive, easily-operated character, which will eliminate all the foregoing objectionable features of present-day practice.

Again, it is an object of the invention to provide a means to hold the brakes in their applied position (regardless of the degree of application, i. e., whether or not the foot pedal is pushed partly forward or fully forward), while leaving the operator free to apply additional braking force (if previously the brakes have been only partly applied), as he may desire.

Other objects will in part be obvious and in part be pointed out hereinafter.

To the attainment of the above objects and ends the invention still further resides in those novel features of construction, combination and arrangement of parts, all of which will be first fully described in the detailed description and then be particularly pointed out in the appended claims, reference being had to the accompanying drawings, in which:—

Fig. 1 is a perspective view of a portion of a Ford chassis with the invention applied.

Fig. 2 is a top plan view of the operating unit.

Fig. 3 is a front elevation of the same.

Fig. 4 is a side elevation of the same, on a reduced scale.

Fig. 5 is a side elevation of the side opposite that shown in Fig. 4.

Fig. 6 is an elevation, on the same scale as Figs. 2 and 3, with the cover plate removed and parts being shown in section on the line 6—6 of Fig. 2 and other parts being broken away.

Fig. 7 is a detail section on the line 7—7 of Fig. 6, the operating magnet being omitted.

Fig. 8 is a sectional view of a pawl and its mounting constructed in accordance with the invention.

In the drawings, in which like numbers of reference indicate like parts in all the figures:

1 represents the side beams of the chassis frame of a Ford "V8" automobile, 2 the arch beams and 3 the cross beams which join the "arches" with the side beams 1.

The cross beam 3 on the left hand side of the vehicle is notched or recessed at 4 to permit the brake-applying rod to pass over. The adjacent beam 2 has an opening through which the rod 5 passes to the brake pedal 6. The rear end of the rod 5 is connected to the arm 7 of the brake power-distributing cross shaft, not shown.

My apparatus comprises two essential units: one the operating unit and the other the control unit. The operating unit is mounted on the left cross beam 3 in front of the same in the front triangle formed by the beams 1, 2, 3 at the left of the frame, while the control unit is mounted on the steering wheel post 54 just beneath the steering wheel 55 so as to be operative by the fingers of the left hand of the driver while on the wheel.

The operating unit

The operating unit comprises a relatively flat case 8 with a removable cover 9. The case has a tubular boss 10 extending from front to back and having an outside cylindrical head 11 for a purpose presently understood.

The boss 10 is bored longitudinally as at 12 to receive the cylindrical rack bar 13 which has ring-like rack teeth 14. The rack bar 13 has a collar 15 with set screw 64 by means of which it is firmly secured to the brake-applying rod 5 which passes through the bore 16 of the rack bar 13. A cup 17 is provided on bar 13 to slidably fit over the head 11 and, together with the head, to constitute a dash pot to cushion the return movement of the brake pedal and prevent noise which would otherwise occur as the pedal hits its back stop.

The case 8 also has a boss 18 bored to receive a bearing pin 19 which also fits into a boss 20 on the cover 9. The bearing pin 19 carries the ratchet-pinion wheel which comprises the toothed ratchet disc 21 and the pinion 22, the two being preferably formed as a unit and always turn together as a unit. The boss 18 is cut out as at 23 so that pinion 22 can mesh with rack teeth 14 (see Fig. 6).

Mounted in bearing bosses 31 (in case 8) and 32 (on cover 9) is a shaft 30 that projects to the outside of the case and carries a lever 33 whose free end is slotted and whose pivot end is secured by a screw 35 to a sleeve 34 that is pinned at 36 to the shaft 30.

Within the case a bifurcated pawl carrier 24 is secured to the shaft 30 and carries a pawl 25 having a tooth 26 to engage the ratchet disc 21 at times. The pawl 25 is pivoted at 27 in the furcation of the carrier 24 and is held against a back stop pin 28 by a spring 29.

In order to bring the tooth 26 into operating engagement with the disc 21 a solenoidal magnet is provided. This magnet comprises a case 56 of iron or other magnetizable material mounted on the cover 9, a core-armature 57 operating in the guide 58, and a winding 59. The case 56 is closed at its top and bottom save for the opening in the bottom for the core-armature 57 to project through. The core-armature 57 is bifurcated at its lower end 60 to straddle the lever 33 to which it is connected by the pin 61 that passes through a slot in the end of the lever (see Fig. 4).

In order to mount the operating unit sufficiently flexibly so as to enable it to adapt itself to the variations in the position or alignment of the rod 5 as the brake is applied, the case has two ears 47 spaced apart vertically. Through the ears 47 a bolt with a nut 48 is passed, and on the bolt is mounted a threaded stud 49 that lies normal to the bolt and passes through a hole in the angle plate 51. The plate 51 lies flat against the front face of beam 3 while a back plate 52 is placed against the back face of beam 3 and the plates are secured to the beam by two bolts 53, with nuts, which pass through suitably located holes in the plates and the beam.

The rod 5 is threaded through the bore 16 and, with the brake off and cup 17 fully over head 11 (see Figs. 2 and 4), the set screw 64 is tightened firmly to secure the rack 13 to the rod 5. Thus when the brake is applied, rack 13 is moved from right to left in Fig. 6, and disc 21 is rotated counter-clockwise.

*The control unit*

The control unit may be any suitable electric circuit containing magnet 56 and closed and opened by any suitable switch. As the specific circuit and switch are not per se parts of the present invention claimed, illustration thereof is thought to be unnecessary.

When the operator applies the brake by pushing in the pedal 6, if he wishes to hold the brake, he closes the circuit which energizes the magnet, which in turn sucks in the core-armature, (preferably until its butt engages the top of the case 56 and closes the air gap there). This rocks shaft 30 and brings tooth 26 into engagement with the teeth of disc 21 so that upon the operator taking his foot off from the brake pedal the pawl and ratchet will hold rack bar 13 (and consequently rod 5) from moving backwardly.

The operator may instantly release the brake by simply opening the circuit again. The core-armature 57 and pawl-carrier 24 are sufficiently weighted so that when the magnet is de-energized the back lash on disc 21 is sufficient to release the tooth 26 from the ratchet disc and leave the usual brake-release spring (not shown) to restore the brake and pedal to the "off" position.

On releasing disc 21 the brake pedal's return movement is cushioned by the air in cup 13, cup 13 and head 11 acting as a dash-pot. Thus there is no noise generated when the pedal engages its usual pedal stop (not shown).

The mounting means shown allows the case 8 to be adjusted on the axis of 48, and to move straight up and down, within the limits of the springs 50, on the axis of 48 (vertically) and to move laterally; thus it will conform to any of the displacements of the rod 5 met with in applying and releasing the brakes.

The pawl 25 is preferably provided with a slot 73 through which the pivot pin 27 passes so that, if when the magnet is energized and tooth 26 is brought into contact with disc 4, should the position of the disc be such that tooth 26 engages the back of a disc tooth, it will yield against the tension of leaf spring 29 sufficiently, as carrier 24 reaches its limit of movement toward ratchet disc 21, so that the tooth 26, under pressure of spring 29 will ride down the tooth incline into full contact with the ratchet as the ratchet moves clockwise in Fig. 6. This insures against accidental disconnection of pawl and ratchet if the brake pedal should be suddenly released and sudden back lash of the ratchet occur. A coil spring 68 assisted by leaf spring 29 holds the pawl in its normal position in the holder 24.

I wish especially to emphasize the fact that for the device to operate properly and positively at all times two things are highly desirable, if not entirely necessary: First, that the tooth 26 shall seat fully in a tooth-notch of the disc 21; and, secondly, that at the same time the magnetic core-armature 57 shall have its upper end actually in contact with the magnetic case 56 at the top of the guide 58. In this way a relatively small magnet can be used that will take only a slight amount of current from the car's battery.

It should also be noted that when pawl 25 is engaging ratchet 21, if the brake is further applied to move the ratchet disc in a counter-clockwise direction in Fig. 6, the pawl will give by pivoting on 27, against the tension of the leaf spring 29, and tooth 26 will pass from notch to notch in the ratchet periphery.

The spring 29 is secured at 69 and has its other end forked or slotted as at 71 (see Fig. 10) to straddle the screw 70 and hold the spring against swivelling on 69.

While my device has been designed principally for use on Ford "V8" cars, it is obvious that with but slight modification in the mounting means it may be adapted to cars of other makes.

From the foregoing description, taken in connection with the accompanying drawings, it is thought that the construction, operation and advantages of the invention will be clear to those skilled in the art to which it appertains.

What I claim is:

1. In an automobile having a frame which includes a longitudinal side beam, a longitudinal arch beam and a cross beam connecting the side beam and the arch beam, and leaving a triangular space in front of the cross beam, a brake rod passing through said space, in combination with a brake-holding device mounted in said space and operatively connected to said rod, and means to control the action of said holding device.

2. In a brake-holding apparatus, in combination with a brake-applying rod, a casing through which said rod passes, a back check device including a pawl and ratchet within said casing and including a member secured to said rod and movable therewith, setting means carried by the casing for setting said device to hold or release said member, and an operator-actuated control unit operatively connected to said setting means, said setting means including a solenoidal magnet that comprises a case of magnetic material, an energizing coil in the case and a magnetizable core connected with said back check device, said core and said case being co-related so that when said coil is energized said core will be drawn into contact directly with said case to close the magnet circuit and said core will, through the pawl, hold the back pressure set up in the brake holding apparatus when the operator releases the brake-applying force.

3. In a device for the purposes stated, a casing, a tubular cylindrical rack bar longitudinally movably mounted in said casing for receiving a brake-applying rod, means to secure said bar to the rod, a pinion-ratchet-disc rotatably mounted in said casing with the pinion thereof meshing with said rack bar, a pawl-carrier shaft journalled in bearings in said casing and carrying a pawl carrier, a pawl having a tooth and being mounted in said carrier, and operator-controlled means to bring said pawl into and out of engagement with said ratchet disc for purposes described.

4. In a device for the purposes stated, a casing, a tubular cylindrical rack bar longitudinally movably mounted in said casing for receiving a brake-applying rod, means to secure said bar to the rod, a pinion-ratchet-disc rotatably mounted in said casing with the pinion thereof meshing with said rack bar, a pawl-carrier shaft journalled in bearings in said casing and carrying a pawl carrier, a pawl having a tooth and being mounted in said carrier, an electro-magnet on said case and having an armature, a connection between said armature and said pawl-carrier shaft, and operator-actuated control means connected with said magnet for energizing and de-energizing the same.

5. In a motor vehicle having a chassis frame and a brake-applying rod, means mounted on said frame and operatively connected to said rod for holding the rod in any of its operative positions, and an operator-actuated controlling device connected with said rod-holding means for controlling the action thereof, said means including a pawl and ratchet and a solenoidal magnet that comprises a case of magnetic material, an energizing coil in the case and a core of magnetic material, said case and said core being co-related so that when the coil is energized the core will be drawn into contact with said case to close the magnetic circuit and said core will, through the pawl, hold the back pressure set up in the brake holding apparatus when the operator releases the brake-applying force.

6. In a brake-rod-holding unit, a casing having a tubular boss, a rack bar longitudinally slidably mounted in said boss, a pinion-ratchet-disc unit rotatably mounted in said case with its pinion in engagement with said bar, a pawl pivotally mounted in said case, means normally holding said pawl away from the ratchet disc, and operator-actuated means to move said pawl into engagement with said ratchet disc to hold said disc against turning in one direction while leaving it free to be turned in the opposite direction.

7. In a brake-rod-holding unit, a casing having a tubular boss, a rack bar longitudinally slidably mounted in said boss, a pinion-ratchet-disc unit rotatably mounted in said case with its pinion in engagement with said bar, a pawl pivotally and one-way yieldably mounted in said case, means normally holding said pawl away from the ratchet disc, and operator-actuated means to move said pawl into engagement with said ratchet disc to hold said disc against turning in one direction while leaving it free to be turned in the opposite direction.

8. In apparatus of the character described, in combination with a brake-actuating rod, a holding unit comprising a case, a one-way acting mechanism in the case and connected with said rod to hold it against backward movement and including connecting and disconnecting means for rendering said mechanism active and inactive when said connecting and disconnecting means is energized and de-energized respectively, and means to mount said case for universal movement to accommodate the unit to varying positions of said rod in service.

9. In apparatus of the character described, in combination with a brake-actuating rod, a holding unit comprising a case, a one-way acting mechanism in the case and connected with said rod to hold it against backward movement and including connecting and disconnecting means for rendering said mechanism active and inactive when said connecting and disconnecting means is energized and deenergized respectively, means to mount said case for universal movement to accommodate the unit to varying positions of said rod in service, said last-named means comprising a fixed mounting plate, a stud pivotally adjustably secured to said plate, and means mounting said stud pivotally on said casing on a vertical axis whereby said casing can move from side to side.

10. In apparatus of the character described, in combination with a brake-actuating rod, a holding unit comprising a case, a one-way acting mechanism in the case and connected with said rod to hold it against backward movement and including connecting and disconnecting means for rendering said mechanism active and inactive when said connecting and disconnecting means is energized and deenergized respectively, means to mount said case for universal movement to accommodate the unit to varying positions of said rod in service, said last-named means comprising a fixed mounting plate, a stud pivotally adjustably secured to said plate, means mounting said stud pivotally on said casing on a vertical axis whereby said casing can move from side to side, said last-named mounting means having provisions for permitting said casing to rise and fall a limited distance on said vertical axis, and balancing springs to resist said rise and fall.

11. In apparatus of the character described, in combination with a brake-actuating rod, a holding unit comprising a case, a one-way acting mechanism in the case and connected with said rod to hold it against backward movement and including connecting and disconnecting means for rendering said mechanism active and inactive when said connecting and disconnecting means is energized and deenergized respectively, means to mount said case for universal movement to accommodate the unit to varying positions of said rod in service, and means forming a part of said unit for cushioning the backward movement of said rod.

12. In a brake-holding device, a unit comprising a casing having a removable cover, and having a tubular boss extending in one direction through the casing, a rack bar longitudinally movable and rotatably adjustable in said boss and having annular rack teeth, said rack bar having a longitudinal bore to receive a brake-applying rod, means to secure said bar on said rod to move with it, a bearing pin supported in said casing, a connected pinion and ratchet disc journalled on said pin with the pinion meshing with said rack bar, a pawl-carrying shaft journalled in bearings in said case and carried by said cover, a pawl device on said pawl-carrying shaft within the case for cooperation with said ratchet disc, a lever on said pawl-carrying shaft on the outside of the cover, a solenoidal magnet having a core connected to said lever, and means normally holding said pawl device out of engagement with said ratchet disc, said magnet when energized being operative to bring and hold said pawl device into operative relation to said ratchet disc.

13. In a brake-holding device, a unit comprising a casing having a removable cover, and having a tubular boss extending in one direction through the casing, a rack bar longitudinally movable and rotatably adjustable in said boss and having annular rack teeth, said rack bar having a longitudinal bore to receive a brake-applying rod, means to secure said bar on said rod to move with it, a bearing pin supported in said casing, a connected pinion and ratchet disc journalled on said pin with the pinion meshing with said rack bar, a pawl-carrying shaft journalled in bearings in said case and carried by said cover, a pawl device on said pawl-carrying shaft within the case for cooperation with said ratchet disc, a lever on said pawl-carrying shaft on the outside of the cover, a solenoidal magnet having a core connected to said lever, means normally holding said pawl device out of engagement with said ratchet disc, said magnet when energized being operative to bring and hold said pawl device into operative relation to said ratchet disc, said pawl device comprising a bifurcated pawl carrier mounted at one end on said pawl-carrying shaft, a pawl pivoted to said pawl carrier in the furcation thereof, means to limit the pivotal movement of the pawl in one direction, and a spring for continuously urging the pawl against said limiting means, said pawl having a tooth to engage with the teeth of said ratchet disc when the carrier is in the operative position.

14. In a brake-holding device, a unit comprising a casing having a removable cover, and having a tubular boss extending in one direction through the casing, a rack bar longitudinally movable and rotatably adjustable in said boss and having annular rack teeth, said rack bar having a longitudinal bore to receive a brake-applying rod, means to secure said bar on said rod to move with it, a bearing pin supported in said casing, a connected pinion and ratchet disc journalled on said pin with the pinion meshing with said rack bar, a pawl-carrying shaft journalled in bearings in said case and carried by said cover, a pawl device on said pawl-carrying shaft within the case for cooperation with said ratchet disc, a lever on said pawl-carrying shaft on the outside of the cover, a solenoidal magnet having a core connected to said lever, means normally holding said pawl device out of engagement with said ratchet disc, said magnet when energized being operative to bring and hold said pawl device into operative relation to said ratchet disc, said pawl device comprising a bifurcated pawl carrier mounted at one end on said pawl-carrying shaft, a pawl pivoted to said pawl carrier in the furcation thereof, means to limit the pivotal movement of the pawl in one direction, and a spring for continuously urging the pawl against said limiting means, said pawl having a tooth to engage with the teeth of said ratchet disc when the carrier is in the operative position, the tooth of the pawl lying to one side of a straight line connecting the pawl-carrier shaft with said bearing pin whereby when the magnet is deenergized backward movement of the ratchet disc will throw off the pawl and assist in restoring it to its inactive position.

15. In a brake-holding device, a unit comprising a casing having a removable cover, and having a tubular boss extending in one direction through the casing, a rack bar longitudinally movable and rotatably adjustable in said boss and having annular rack teeth, said rack bar having a longitudinal bore to receive a brake-applying rod, means to secure said bar on said rod to move with it, a bearing pin supported in said casing, a connected pinion and ratchet disc journalled on said pin with the pinion meshing with said rack bar, a pawl-carrying shaft journalled in bearings in said case and carried by said cover, a pawl device on said pawl-carrying shaft within the case for cooperation with said ratchet disc, a lever on said pawl-carrying shaft on the outside of the cover, a solenoidal magnet having a core connected to said lever, and means normally holding said pawl device out of engagement with said ratchet disc, said magnet when energized being operative to bring and hold said pawl device into operative relation to said ratchet disc, said tubular boss having a head extension, and said rack bar having a cup to fit said head with a sliding fit and cooperate with it as a dash-pot to cushion the return movement of the rack bar and the brake rod to which it is attached.

16. In a brake-holding apparatus, a casing, a rack bar longitudinally movably mounted in the casing, means to connect said bar to the brake-applying mechanism of an automobile, a pinion-ratchet-disc rotatably mounted in said casing with the pinion thereof meshing with said rack bar, a pawl-carrying shaft journalled in bearings in said casing, a pawl carried by said shaft and having a tooth to engage with the ratchet part of said pinion-ratchet-disc, a solenoidal magnet having a case of magnetic material and a core-armature, and means connecting said armature and said pawl-carrying shaft, all being constructed so that when said magnet is engaged the core will be drawn to engage with said case and close the magnetic circuit and the pawl will be brought positively into operative engagement with said ratchet part for purposes described.

17. In brake holding apparatus in combination with a mechanical brake applying system, a back check device cooperatively connected with said system and including pawl and ratchet means to hold the brakes set, said means including a solenoidal magnet which comprises a case of magnetic material, an energizing coil in the case, and a core of magnetizable material connected with the pawl of said pawl and ratchet means, said core and said case being constructed so that said core will be fully drawn in and seated in contact with the case by magnetic force so as to close the magnetic circuit and said core will, through said pawl, hold the back pressure set up in the brake holding apparatus when the operator releases the brake-applying force, and operator actuated means to control the energization of said coil.

18. In a device for the purposes stated, a casing, a tubular cylindrical rack bar longitudinally movably mounted in said casing for receiving a brake-applying rod, means to secure said bar to the rod, a pinion-ratchet-disc rotatably mounted in said casing with the pinion thereof meshing with said rack bar, a pawl-carrier shaft journalled in bearings in said casing and carrying a pawl-carrier, said pawl-carrier having a slot, a pawl located in said slot, a pivot pin on which said pawl is mounted, said pawl having a slot to receive said pin and permit limited longitudinal movement of the pawl in said carrier, a spring continuously urging said pawl in one longitudinal direction, a stop on the carrier limiting pivotal movement of said pawl in one direction and a second spring on the carrier continuously tending to hold said pawl against said stop, said pawl having a tooth projecting outside said carrier.

19. In a device for the purposes stated, a casing, a tubular cylindrical rack bar longitudinally movably mounted in said casing for receiving a brake-applying rod, means to secure said bar to the rod, a pinion-ratchet-disc rotatably mounted in said casing with the pinion thereof meshing with said rack bar, a pawl-carrier shaft journalled in bearings in said casing and carrying a pawl-carrier, said pawl-carrier having a slot, a pawl located in said slot, a pivot pin on which said pawl is mounted, said pawl having a slot to receive said pin and permit limited longitudinal movement of the pawl in said carrier, a spring continuously urging said pawl in one longitudinal direction, a stop on the carrier limiting pivotal movement of said pawl in one direction and a second spring on the carrier continuously tending to hold said pawl against said stop, said pawl having a tooth projecting outside said carrier, said first spring comprising a coil spring one end of which is anchored to said carrier and the other end to said pawl.

20. In a device for the purposes stated, a casing, a tubular cylindrical rack bar longitudinally movably mounted in said casing for receiving a brake-applying rod, means to secure said bar to the rod, a pinion-ratchet-disc rotatably mounted in said casing with the pinion thereof meshing with said rack bar, a pawl-carrier shaft journalled in bearings in said casing and carrying a pawl-carrier, said pawl-carrier having a slot, a pawl located in said slot, a pivot pin on which said pawl is mounted, said pawl having a slot to receive said pin and permit limited longitudinal movement of the pawl in said carrier, a spring continuously urging said pawl in one longitudinal direction, a stop on the carrier limiting pivotal movement of said pawl in one direction and a second spring on the carrier continuously tending to hold said pawl against said stop, said pawl having a tooth projecting outside said carrier, said first spring comprising a coil spring one end of which is anchored to said carrier and the other end to said pawl, said second spring comprising a leaf anchored at one end to said carrier and means on said pawl to hold said leaf against swivelling on its anchor.

FRANK L. DARLING.